United States Patent [19]

Kühbauch

[11] Patent Number: 4,847,941
[45] Date of Patent: Jul. 18, 1989

[54] WINDSHIELD WIPER DEVICE FOR MOTOR VEHICLES

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 5,258

[22] Filed: Jan. 20, 1987

[30] Foreign Application Priority Data

Apr. 1, 1986 [DE] Fed. Rep. of Germany ....... 3610879

[51] Int. Cl.$^4$ ................................................. B60S 1/26
[52] U.S. Cl. .................................................. 15/250.21
[58] Field of Search ............ 15/250.21, 250.13, 250.23

[56] References Cited

U.S. PATENT DOCUMENTS 3,831,221 8/1974 Gmeiner ........................... 15/250.21
4,570,283 2/1986 Osterday ........................... 15/250.21

FOREIGN PATENT DOCUMENTS 3416466 11/1985 Fed. Rep. of Germany ... 15/250.21

Primary Examiner—Harvey C. Hornsby
Assistant Examiner—K. L. O'Leary
Attorney, Agent, or Firm—Michael J. Striker

[57] ABSTRACT

A windshield wiper device includes an oscillating wiper blade supported on a wiper arm which oscillates together with the wiper blade on the windshield to be wiped and is connected with a drive which imparts to the wiper arm a longitudinal displacement during the oscillating motion. The drive includes a gear, a stationary toothed segment meshed with the gear, and a crank mechanism having a crank and a driving rod connected to the crank. An intermediate drive is provided between a reciprocating element connected to the wiper arm and the driving rod of the drive to enlarge a path of the translatory movement of the driving rod.

3 Claims, 1 Drawing Sheet

WINDSHIELD WIPER DEVICE FOR MOTOR VEHICLES

BACKGROUND OF THE INVENTION

The present invention relates to a windshield wiper device for motor vehicles.

Wiper systems for wiping windshields of motor vehicles of the foregoing type normally comprise a wiper blade lying against the windshield and oscillating on said windshield by means of an oscillation drive. Conventional wiper systems are widely employed and disclosed, for example in U. S. Pat. Nos. 2,215,307; 3,831,220, DE-PS No. 2215 307, etc.

In the windshield wiper device shown in DE-PS No. 22 15307, the driving rod of the crank drive is hinged directly on the stroke lever connected to the wiper arm of the wiper blade. The length of the stroke carried out by that lever depends directly upon the effective length of the crank. This length can not be however substantially increased since the space to be occupied by the wiper system is limited, particularly when the structural components of the drive must be accommodated within the housing and the crank makes at least one complete revolution in the drive of the wiper system.

SUMMARY OF THE INVENTION

It is an object of the present invention to provide an improved windshield wiper device.

It is another object of the invention to provide a wiper device in which with a relatively small effective length of the crank of the crank drive, a large stroke of the stroke lever can be obtained because a small displacement path caused by the driving rod of the crank drive can be increased by an intermediate drive in accordance with requirements. Furthermore, according to the invention an improved adjustment of the shape of the field being wiped on the windshield to the respective shape of the windshield is provided. The kinematics of the wiper device of the present invention permits to optimimize speeds of wiping, and the acceleration of the wiper blade, and etc.

The objects of the present invention are attained by a wiper device for windshields of motor vehicles, comprising an oscillating wiper blade lying on a windshield to be wiped; a driving oscillating transmission member connected to said wiper blade; drive means connected to said transmission member, said wiper blade being displaceable in the direction of elongation thereof during an oscillating movement by said drive means, said drive means including a gear supported on said transmission member, a stationary toothed segment which is in mesh with said gear, a crank mechanism including a crank rigidly connected to said gear, and a driving rod connected to said crank; a reciprocating element guided in said transmission member and operatively connected to said driving rod, said reciprocating element being operatively connected to said wiper blade; and an intermediate drive interconnected between said driving rod and said reciprocating element and enlarging a translatory movement of said driving rod, said intermediate drive including a driven member cooperating with said reciprocating element.

The intermediate drive may be formed as a four-bar mechanism.

The intermediate drive may further include a rocker which is coupled with said driving rold, an oscillating shaft rigidly connected to said rocker and supported on said transmission member, and a swinging lever secured to said oscillating shaft and having a free end region at which said driven member is hinged, said driven member being a coupling rod and having another end pivotally connected to said reciprocating element whereby an effective length of said rocker is smaller than an effective length of said swinging lever. This embodiment is particularly advantageous.

An axis of the oscillating shaft may extend parallel to an axis of rotation of said gear, said rocker, as seen in a direction of the axis of said oscillating shaft, including with said swinging lever an angle $\beta$.

The rocker and the swinging lever may be formed on a single structural component on which hinge connections between said driving rod and said driven member are provided.

The intermediate drive may be formed as a gear-crank mechanism or as a multi-lever linkage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
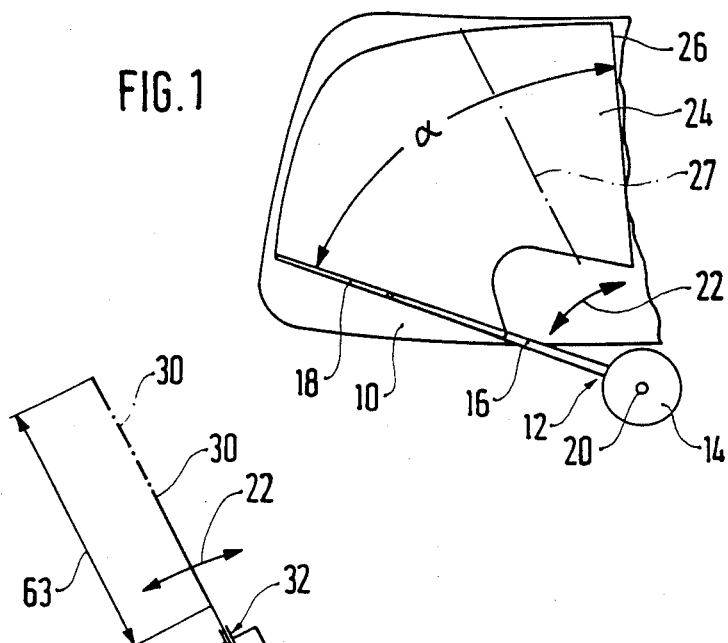
FIG. 1 is a front view of the windshield of the motor vehicle with a wiper system according to the invention.

Referring now to the drawings in detail it will be seen that on a windshield 1 a wiper system 12 is mounted. The wiper system has a reduction gearing 14 which oscillatingly drives a wiper arm 16. Thereby the wiper arm oscillates together with a wiper blade 18 secured to the free end of the wiper arm about a pivot axis 20, which belongs to the reduction gearing 14, between two end positions as shown by double arrow 22 in FIG. 1. One end position is shown in FIG. 1 by a linear extension of wiper blade 18 whereas the other end position is shown by a straight line 26 which limits a wiping area 24 covered by the wiper blade 18 in its swinging motion. During the swinging or oscillating movement, a radial displacement movement relative to the pivot axis 20 is imparted to the wiper blade 18 lying on the windshield to be wiped so that the wiping field 24 covered by the wiper blade 18 has the shape deviated from the circular segment. The wiper devices of such structure must also cover the corner area of the windshield remote from the pivot axis.

Figure 2:
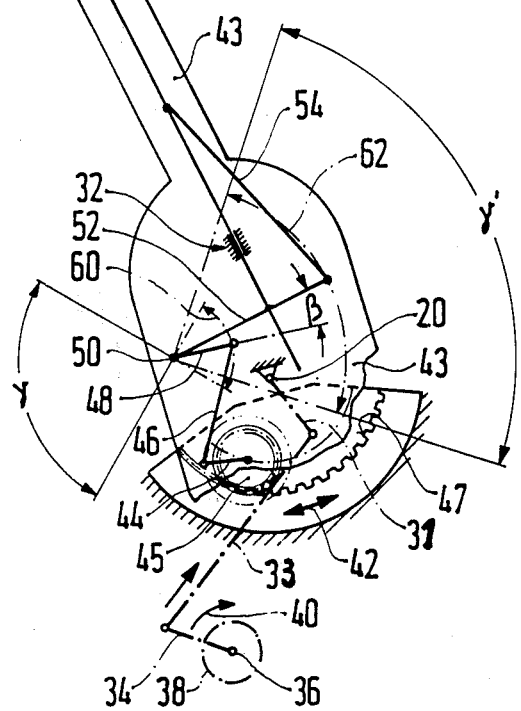
FIG. 2 is a schematic view of the drive device for the wiper system of FIG. 1, on enlarged scale.

With reference to FIG. 2 it will be seen that only a drive is illustrated in this figure while the wiper arm and wiper blade are not shown for the sake of clarity. The drive device as shown is positioned in an operative condition which the device takes when the wiper blade 18 takes its operation position. As shown in FIG. 2, the pivot axis 20 is formed by a pivot shaft rigidly secured to a frame. A swinging arm 31 is connected to the pivot shaft 20. A driving rod 33 is hingedly connected to the free end of arm 31. The other end of the driving rod 33 is hingedly connected to a driving crank 34 which in turn is connected to a driven shaft 36 of a gearing unit 38. When the driven shaft 36 of the gearing unit 38 rotates in the direction of arrow 40 the driving crank 34 is taken along and shifts the swinging arm 31 via the driving rod 33 into the swinging motion indicated by the double arrow 42. The swinging arm 31 rigidly connected with the wiper shaft 20 thereby takes the latter along in its swinging motion. The swinging angle of the wiper shaft 20 coincides with the swinging or oscillating angle α of the wiper arm 16 or wiper blade 18 as shown in FIG. 1.

The wiper arm 16 is connected to a lever or reciprocating element 30 (FIG. 2) which is displaceable in the direction of elongation thereof in slide guides 32. The guides 32 are rigidly fastened to a transmission member 43 to which the wiper shaft 20 is also connected. The oscillating movement is thereby translated to the wiper arm 16 and wiper blade 18 from the shaft 20 via the transmission member 43 and lever 30. The oscillating movement of the transmission member 43 is shown in FIG. 2 by the double arrow which is indicated by reference numeral 22. A gear 45 is rotatably supported on the transmission member 43. The axis of rotation of gear 45 extends parallel to a segment 47 which has an internal toothing and is stationary. A crank 44 is rigidly secured to the gear 45. The end of the driving rod 46 is hingedly connected to the free end of crank 44. This crank and the driving rod 46 together form a crank drive which changes over the rotation movement of the crank into the to-and-fro movement. The end of the driving rod 46 which faces away from the crank 44 is pivotable on the free end of a rocker arm 48 the other end of which is rigidly connected to an oscillating or swinging shaft 50 which is supported in the transmission member 43. Further a swinging lever 52 is connected to the oscillating shaft 50. The end of a coupling rod 54 is in turn pivotally connected to the free end of the swinging shaft 50. The other end of the coupling rod 54 is pivotally connected to the lever 30. The swinging lever 52, the coupling rod 54 and the lever 30 form together a crank mechanism. As further seen in FIG. 2 the rocker arm 48 and the swinging lever 52 include in the direction of the axis of the oscillating shaft 50 an angle β.

The simplest structure of the drive can be obtained when the rocker arm 48 and the swinging lever 52 are formed on a single rod-shaped element which has pivoting connections with the driving rod 46 and the coupling rod 54. Thereby angle β will be zero. When the driven shaft 36 of the gearing unit 38 rotates in the direction of arrow 40 the transmission member 43 and the wiper blade 18 therewith will perform the oscillating motion in the directions of arrow 22, whereby the oscillating angle α will be covered. During the oscillating motion the gear 45 rolls on the toothed segment 47 and thereby performs a rotational movement.

The crank 44 is also rotated upon the rotation of gear 45 whereby the rotational movement of crank 44 is translated into the oscillating movement of the rocker arm 48. Upon the oscillating motion of rocker arm 48 the oscillating shaft 50 performs the same oscillating movement which is transmitted to the swinging lever 52 rigidly connected to the oscillating shaft 50. The oscillating motion of the swinging lever 52 is now induced via the coupling rod 54 to the lever 30 which is guided in the slide guides 32 and carries out a reciprocating movement designated by a double arrow 63. Inasmuch as this movement is also translated to the wiper blade 18 the field 24 being wiped is of the shape deviated from the circular segment as shown in FIG. 1. During the operation of the wiper system the rocker arm 48 covers in its motion an oscillation angle γ which corresponds to an oscillation angle γ' of the swinging lever 52. The kinematically efficient lengths of the rocker arm 48 and swinging lever 52 are denoted by dash-dotted lines 60 and 62 which coincide with the circles on which the hinges between the driving crank and rocker arm 48 (circle 60) and between the swinging lever 52 and the coupling rod 54 (circle 62) swing. As clearly shown in the drawing, the hinge on the rocker arm 48 covers a considerably shorter path than that of the hinge on the swinging lever 52. Thereby it is obtained that a small oscillating path 60 effected by the short crank 44 can be changed over into a considerably greater stroke 63 when between the driving rod 46 and the lever 30 a greater translatory movement of the driving rod 46 of an enlarged intermediate transmission 48, 50, 52, 54 is provided, and the driven member 54 of this transmission is in the operative connection with the lever 30.

It will be understood that each of the elements described above, or two or more together, may also find a useful application in other types of wiper systems for windshields of motor vehicles differing from the types described above.

While the invention has been illustrated and described as embodied in a wiper system for windshields of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiper device for windshields of motor vehicles, comprising: an oscillating wiper blade lying on a windshield to be wiped; a driving oscillating transmission member connected to said wiper blade; drive means connected to said transmission member, said wiper blade being displaceable in the direction of elongation thereof during an oscillating movement by said drive means, said drive means including a gear rotatably supported on said transmission member, a stationary toothed segment which is in mesh with said gear, a crank mechanism including a crank rigidly connected at one end to said gear to rotate therewith, and a driving rod connected at the opposite end of said crank; a reciprocating element (30) guided in said transmission member and operatively connected to another end of said driving rod, said reciprocating element being operatively connected to said wiper blade; and an intermediate drive (48, 50, 52, 54) interconnected between said driving rod and said reciprocating element and enlarging a path of a translatory movement of said driving rod (46), said intermediate drive being formed as a four-bar mechanism and including a driven member (54) cooperating with said reciprocating element (30), a rocker (48) which is coupled with said driving rod, an oscillating shaft (50) rigidly connected to said rocker and supported on said transmission member, and a swinging lever (52) secured to said oscillating shaft and having a free end region at which said driven member (54) is hinged, said driven member being a coupling rod and having another end pivotally connected to said reciprocating element (30) whereby an effective length of said rocker is smaller than an effective length of said swinging lever.

2. The wiper device as defined in claim 1, wherein an axis of said oscillating shaft extends parallel to an axis of rotation of said gear, said rocker, as seen in a direction of the axis of said oscillating shaft, including with said swinging lever an angle $\beta$.

3. The wiper device as defined in claim 1, wherein said rocker (48) and said swinging lever (52) are formed on a single structural component on which hinge connections between said driving rod (46) and said driven member (54) are provided.

* * * * *